(12) United States Patent
Fukunishi

(10) Patent No.: US 9,118,840 B2
(45) Date of Patent: Aug. 25, 2015

(54) IMAGE PROCESSING APPARATUS WHICH CALCULATES MOTION VECTORS BETWEEN IMAGES SHOT UNDER DIFFERENT EXPOSURE CONDITIONS, IMAGE PROCESSING METHOD, AND COMPUTER READABLE MEDIUM

(71) Applicant: OLYMPUS CORPORATION, Shibuya-ku, Tokyo (JP)

(72) Inventor: Munenori Fukunishi, San Jose, CA (US)

(73) Assignee: OLYMPUS CORPORATION, Tokyo (JP)

( * ) Notice: Subject to any disclaimer, the term of this patent is extended or adjusted under 35 U.S.C. 154(b) by 62 days.

(21) Appl. No.: 14/061,547

(22) Filed: Oct. 23, 2013

(65) Prior Publication Data

US 2014/0049657 A1    Feb. 20, 2014

Related U.S. Application Data

(63) Continuation of application No. PCT/JP2012/060920, filed on Apr. 24, 2012.

(30) Foreign Application Priority Data

Apr. 28, 2011    (JP) .................................. 2011-100738

(51) Int. Cl.
*H04N 5/228*   (2006.01)
*H04N 5/235*   (2006.01)
(Continued)

(52) U.S. Cl.
CPC ............ *H04N 5/2355* (2013.01); *G06T 7/0026* (2013.01); *G06T 7/2013* (2013.01);
(Continued)

(58) Field of Classification Search
CPC ... G06K 9/40; H04N 5/2355; H04N 5/23264; H04N 5/23251; H04N 5/23254; H04N 5/23277

USPC ............... 348/208.4, 221; 382/103, 105–107, 382/205, 255, 260, 264
See application file for complete search history.

(56) References Cited

U.S. PATENT DOCUMENTS 7,092,019 B1    8/2006   Ogata et al.
7,142,723 B2    11/2006  Kang et al.
(Continued)

FOREIGN PATENT DOCUMENTS

EP      1507234 A1    2/2005
JP      05-007336 A   1/1993
(Continued)

OTHER PUBLICATIONS

International Search Report (ISR) dated Jul. 31, 2012 (and English translation thereof) issued in International Application No. PCT/JP2012/060920.
(Continued)

*Primary Examiner* — Kelly L Jerabek
(74) *Attorney, Agent, or Firm* — Holtz, Holtz, Goodman & Chick PC

(57) ABSTRACT

An image processing apparatus obtains a motion vector between at least three images including first, second, and third images obtained through continuous shooting under different exposure conditions and computes a first motion vector between the first and second images and a second motion vector between the first and third images in a plurality of positions on the first image. A reliability level of the motion vector is determined, and an estimated motion vector between the first and second images is computed for the first motion vector having low reliability based on the second motion vector computed in the corresponding position and the shooting interval between the images. In a case where the second motion vector computed in a position corresponding to that of the first motion vector having low reliability has high reliability, the first motion vector having low reliability is substituted with the estimated motion vector.

10 Claims, 12 Drawing Sheets

(51) Int. Cl.
  *G06T 7/00* (2006.01)
  *G06T 7/20* (2006.01)
  *H04N 5/355* (2011.01)
  *G06K 9/40* (2006.01)
  *H04N 5/232* (2006.01)

(52) U.S. Cl.
  CPC .. *H04N5/35581* (2013.01); *G06T 2207/10016* (2013.01); *G06T 2207/10144* (2013.01); *G06T 2207/20012* (2013.01); *G06T 2207/20021* (2013.01); *H04N 5/23254* (2013.01)

(56) References Cited

U.S. PATENT DOCUMENTS

| | | | |
|---|---|---|---|
| 2001/0002922 A1* | 6/2001 | Hayashi | 375/240.16 |
| 2001/0031089 A1* | 10/2001 | Hata et al. | 382/232 |
| 2005/0212974 A1* | 9/2005 | Michel et al. | 348/699 |
| 2007/0065130 A1* | 3/2007 | Fukumoto et al. | 396/55 |
| 2008/0056613 A1 | 3/2008 | Hatanaka et al. | |
| 2008/0199063 A1* | 8/2008 | O'Halloran et al. | 382/131 |
| 2010/0157072 A1* | 6/2010 | Luo et al. | 348/208.4 |

FOREIGN PATENT DOCUMENTS

| | | |
|---|---|---|
| JP | 2000-341582 A | 12/2000 |
| JP | 2007-202098 A | 8/2007 |
| JP | 2007-272459 A | 10/2007 |
| JP | 2008-277896 A | 11/2008 |
| JP | 2011-171991 A | 9/2011 |

OTHER PUBLICATIONS

Extended European Search Report dated Sep. 26, 2014 issued in counterpart European Application No. 12777225.9.

* cited by examiner

IMAGE PROCESSING APPARATUS WHICH CALCULATES MOTION VECTORS BETWEEN IMAGES SHOT UNDER DIFFERENT EXPOSURE CONDITIONS, IMAGE PROCESSING METHOD, AND COMPUTER READABLE MEDIUM

CROSS REFERENCE TO RELATED APPLICATIONS

This application is a continuation of International Patent Application No. PCT/JP2012/060920, filed on Apr. 24, 2012, which claims the benefit of Japanese Patent Application No. JP 2011-100738, filed on Apr. 28, 2011, which is incorporated by reference as if fully set forth.

TECHNICAL FIELD

The present invention relates to a technology of creating an image having a wide dynamic range by synthesizing a plurality of images.

BACKGROUND ART

In the field of a digital still camera or a digital video camera, there is known an image synthesis technique in which a plurality of image data obtained through continuous shooting by changing an exposure condition such as a shutter speed or a f-number are synthesized to create an image having a wide dynamic range. In such an image synthesis technique using the continuous shooting, a method of performing position alignment or correcting a positional deviation between images becomes important in order to alleviate an influence of a blur caused by handshaking or an object movement generated during the continuous shooting.

While various position alignment methods are known in the art, a template matching method is typically employed in an embedded system. In the template matching method, an area (template) having a predetermined size (for example, 8 pixels by 8 lines) is defined in one (reference image) of a pair of images as a position alignment target, and a matching index value representing a matching degree between the template and the comparison target image is sequentially computed by shifting the template within a predetermined range (search range) of the other image (comparison target image). In addition, a relative positional deviation between images is obtained by searching an area having the highest matching index value (or lowest value depending on a type of the matching index value). The matching index value may include a sum of squared intensity difference (SSD), a sum of absolute intensity difference (SAD) of the error, a normalized cross-correlation (NCC), and the like.

The SSD is defined in the following Equation (1). Determination is made such that the matching degree increases as the SSD decreases.

$$R_{SSD} = \sum_{j=0}^{N-1} \sum_{i=0}^{M-1} (I(i,j) - T(i,j))^2, \quad (1)$$

where a size of the template is set to M×N [pixels], and T(i, j) and I(i, j) denote a luminance value of the template in a template position (i, j) and a luminance value of the comparison target image, respectively.

The SAD is defined in the following Equation (2). Determination is made such that the matching degree increases as the SAD decreases.

$$R_{SAD} = \sum_{j=0}^{N-1} \sum_{i=0}^{M-1} |I(i,j) - T(i,j)| \quad (2)$$

The NCC is defined in the following Equation (3). Determination is made such that the matching degree increases as the NCC increases.

$$R_{NCC} = \frac{\sum_{j=0}^{N-1} \sum_{i=0}^{M-1} I(i,j) \cdot T(i,j)}{\sqrt{\sum_{j=0}^{N-1} \sum_{i=0}^{M-1} I(i,j)^2 \times \sum_{j=0}^{N-1} \sum_{i=0}^{M-1} T(i,j)^2}} \quad (3)$$

The normalized cross-correlation method is advantageous in that images having different brightness levels can be directly used as a processing image because a normalization term is included in the index value. However, a computation amount disadvantageously increases. Meanwhile, in the SAD or SSD method, basically, it is assumed that images having matching brightness levels are input. However, since a computation amount is relatively small, the SAD or SSD method is widely employed.

A technique of obtaining an image having a wide dynamic range by performing a position alignment process and a synthesis process for images obtained through continuous shooting under different exposure conditions is also disclosed in JP5-7336A, JP2008-277896A, JP2007-202098A, and JP2007-272459A.

In the technique disclosed in JP5-7336A, an image having a wide dynamic range is obtained by synthesizing a plurality of images obtained by performing shooting under different exposure conditions, and a synthesis process is performed after a time-dependent positional deviation is corrected.

In the technique of JP2008-277896A, shooting is alternately performed to obtain a short-exposure image and a long-exposure image, and it is determined that a long-exposure image having a smaller absolute difference out of the long-exposure images obtained before and after the short-exposure image is suitable for the synthesis, so that the long-exposure image having the smaller absolute difference is selected as a synthesis image.

In the technique disclosed in JP2007-202098A, a synthesized image is obtained by performing a synthesis process after correcting the positional deviation between the short-exposure image and the long-exposure image. In the synthesis process, a blur is suppressed by changing a synthesis ratio from a pair of differential images while an edge blur and a noise are separated using a threshold value.

In the technique disclosed in JP2007-272459A, in an imaging device capable of obtaining a wide dynamic range by synthesizing a plurality of images obtained under different exposure conditions, reliability of the displacement is obtained based on a relative displacement between images, a plurality of images used in the synthesis are selected based on the obtained reliability, position alignment is performed for a plurality of the selected images based on the displacement of the images, and the synthesis is performed.

SUMMARY OF INVENTION

An image processing apparatus of an aspect of the present invention obtains a motion vector between at least three images, including first, second, and third images obtained through continuous shooting under different exposure conditions in which an exposure amount difference between the first and second images is larger than that between the first and third images. The image processing apparatus comprises a first motion vector computing unit that is configured to compute a first motion vector as a motion vector between the first and second images in a plurality of positions on the first image, a second motion vector computing unit that is configured to compute a second motion vector as a motion vector between the first and third images in a plurality of positions on the first image where the first motion vector is computed, a first reliability determining unit that is configured to determine a reliability level of the first motion vector, a second reliability determining unit that is configured to determine a reliability level of the second motion vector, an estimated motion vector computing unit that is configured to compute an estimated motion vector between the first and second images for a motion vector determined to have low reliability out of the first motion vectors computed in a plurality of positions on the first image based on the second motion vector computed in a corresponding position and a shooting interval between the images, and a motion vector substituting unit that is configured to substitute the first motion vector determined to have low reliability with the estimated motion vector when the second motion vector computed in a position corresponding to that of the first motion vector determined to have low reliability has high reliability.

An image processing method of another aspect of the present invention for obtaining a motion vector between at least three images, including first, second, and third images obtained through continuous shooting under different exposure conditions in which an exposure amount difference between the first and second images is larger than that between the first and third images comprises the steps of computing a first motion vector as a motion vector between the first and second images in a plurality of positions on the first image, computing a second motion vector as a motion vector between the first and third images in a plurality of positions on the first image where the first motion vector is computed, determining a reliability level of the first motion vector, determining a reliability level of the second motion vector, computing an estimated motion vector between the first and second images for a motion vector determined to have low reliability out of the first motion vectors computed in a plurality of positions on the first image based on the second motion vector computed in a corresponding position and a shooting interval between the images, and substituting the first motion vector determined to have low reliability with the estimated motion vector when the second motion vector computed in a position corresponding to that of the first motion vector determined to have low reliability has high reliability.

A storage device stores an image processing program of yet another aspect of the present invention for obtaining a motion vector between at least three images, including first, second, and third images obtained through continuous shooting under different exposure conditions in which an exposure amount difference between the first and second images is larger than that between the first and third images. The image processing program causes a computer to execute the steps of computing a first motion vector as a motion vector between the first and second images in a plurality of positions on the first image, computing a second motion vector as a motion vector between the first and third images in a plurality of positions on the first image where the first motion vector is computed, determining a reliability level of the first motion vector, determining a reliability level of the second motion vector, computing an estimated motion vector between the first and second images for a motion vector determined to have low reliability out of the first motion vectors computed in a plurality of positions on the first image based on the second motion vector computed in a corresponding position and a shooting interval between the images, and substituting the first motion vector determined to have low reliability with the estimated motion vector when the second motion vector computed in a position corresponding to that of the first motion vector determined to have low reliability has high reliability.

DESCRIPTION OF EMBODIMENTS

<First Embodiment>

Figure 1:
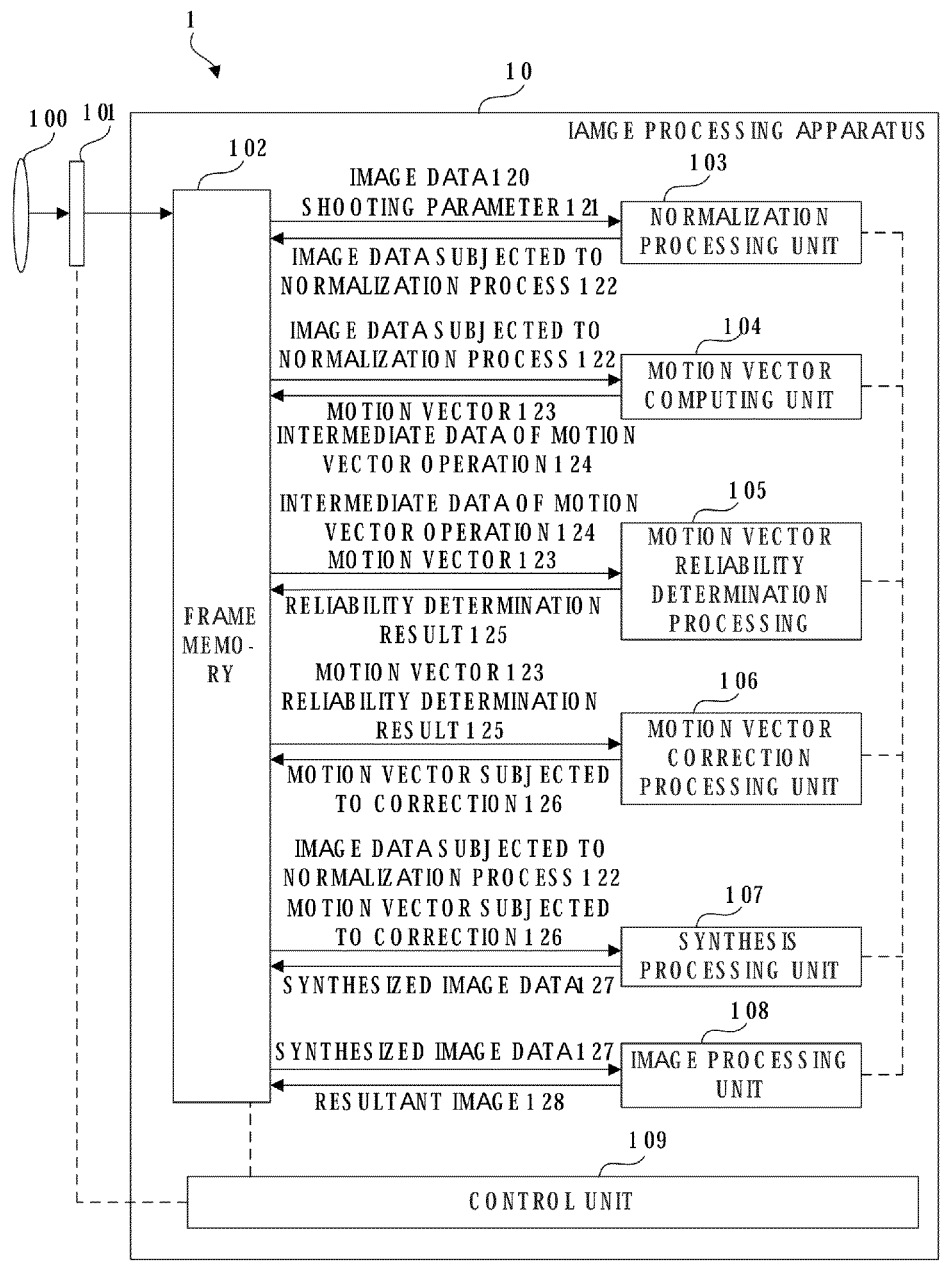
FIG. 1 is a block diagram illustrating a configuration of a digital camera having an image processing apparatus according to a first embodiment.

FIG. 1 is a block diagram illustrating a configuration of a digital camera 1 having an image processing apparatus 10 according to a first embodiment. The digital camera 1 may be a lens-body integration type camera or a lens exchange type camera. The digital camera 1 includes an optical system 100, an image sensor 101, and an image processing apparatus 10.

The image processing apparatus 10 includes a frame memory 102, a normalization processing unit 103, a motion vector operating unit (also referred to as a first motion vector computing unit and a second motion vector computing unit) 104, a motion vector reliability determination processing unit (also referred to as a first reliability determining unit and a second reliability determining unit) 105, a motion vector correcting unit (also referred to as an estimated motion vector computing unit or a motion vector substituting unit) 106, a synthesis processing unit (also referred to as a first positional deviation correcting unit, a first synthesizing unit, a second positional deviation correcting unit, or a second synthesizing unit) 107, an image processing unit 108, and a control unit 109. In the drawings, the solid-lined arrows denote a flow of data, and the dotted lines denote the control signal.

The image sensor 101 includes, for example, a charge coupled device (CCD) or a complementary metal oxide semiconductor (CMOS) and outputs an object light input through an optical system 100 such as a lens as an electric signal by performing opto-electrical conversion. The electric signal output from the image sensor 101 is stored in the frame memory 102 as image data. The image data stored in the frame memory 102 are raw image data having information on any one of red (R), green (G), and blue (B) signals for each pixel based on a Bayer array.

The normalization processing unit 103 reads the image data 120 and shooting parameters 121 from the frame memory 102 and performs a normalization process for matching signal levels (luminance levels) of a plurality of image data serving as a target of the position alignment process and the synthesis process. The shooting parameters 121 include, at least, an exposure time at the time of imaging. The image data 122 subjected to the normalization process is stored in the frame memory 102.

The motion vector operating unit 104 obtains a motion vector representing a positional deviation between images for a plurality of image data 122 subjected to the normalization process. The motion vector 123 obtained by the motion vector operating unit 104 and the intermediate data 124 of the motion vector operation are stored in the frame memory 102. The intermediate data 124 of the motion vector operation will be described below.

The motion vector reliability determination processing unit 105 determines a reliability level of the motion vector 123 obtained by the motion vector operating unit 104 based on the intermediate data 124 of the motion vector operation. The obtained reliability determination result 125 is stored in the frame memory 102.

The motion vector correcting unit 106 corrects the motion vector 123 based on the reliability determination result 125. The obtained motion vector 126 subjected to the correction is stored in the frame memory 102.

The synthesis processing unit 107 creates synthesized image data 127 by synthesizing a plurality of image data 122 subjected to the normalization process after correcting the positional deviation between the image data based on the motion vector 123 or the motion vector 126 subjected to the correction. The synthesized image data 127 is stored in the frame memory 102.

The image processing unit 108 performs a developing process (demosaicing) for allocating R, G, and B signals to each pixel of the synthesized image data 127. In addition, the image processing unit 108 performs various image processing techniques such as noise reduction or edge emphasis as necessary to obtain a desired image. The image subjected to various image processing techniques including the developing process is displayed on, for example, a display unit (not illustrated).

The control unit 109 performs control for the entire digital camera 1.

The image processing apparatus 10 according to the present embodiment creates a synthesized image having a wide dynamic range by synthesizing a plurality of image data having a different exposure time. For this reason, the digital camera 1 performs continuous shooting by changing an exposure condition.

Figure 2:
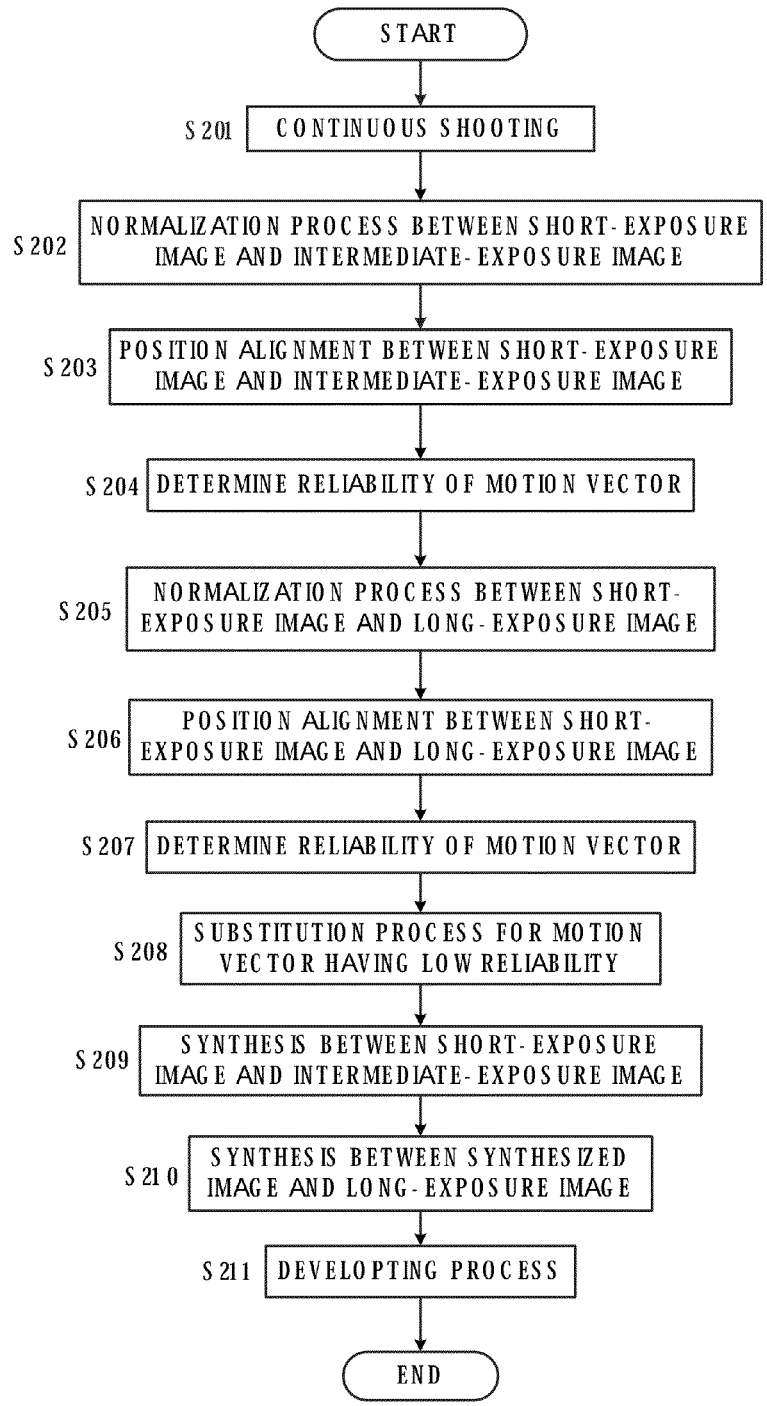
FIG. 2 is a flowchart illustrating details of a synthesized image creating process performed by the digital camera having the image processing apparatus according to the first embodiment.

FIG. 2 is a flowchart illustrating details of the synthesized image creating process performed by the digital camera 1 having the image processing apparatus according to the first embodiment. For example, if the digital camera 1 is set to a synthesized image creation mode for creating a synthesized image, and a user presses a release button, the processing in step S201 is initiated.

In step S201, continuous shooting is performed by changing an exposure condition. Here, the exposure condition is set such that shooting can be made from an underexposure side to an overexposure side depending on a brightness of the scene. According to the present embodiment, the shooting is performed by changing the exposure time (shutter speed) while an aperture stop and an ISO sensitivity are constantly maintained. Alternatively, the shooting can be made by changing the aperture stop while the exposure time and ISO sensitivity are constantly maintained. According to the first embodiment, the shooting is performed three times so as to sequentially obtain a short-exposure image (high-speed shutter), a long-exposure image (low-speed shutter), and an intermediate-exposure image (intermediate-speed shutter). The images obtained through the shooting are stored in the frame memory 102.

In steps S202 to S204, a process of obtaining a motion vector representing a positional deviation amount between the short-exposure image and the intermediate-exposure image is performed.

In step S202, the normalization processing unit 103 operates a ratio of the exposure time between the intermediate-exposure image and the short-exposure image using the shooting parameter 121 at the time of shooting. Then, the normalization processing unit 103 performs a normalization process for matching signal levels between the short-exposure image and the intermediate-exposure image by multiplying a factor corresponding to the ratio of the exposure time by each pixel value of the short-exposure image. The image subjected to the normalization process is stored in the frame memory 102.

Figure 3:
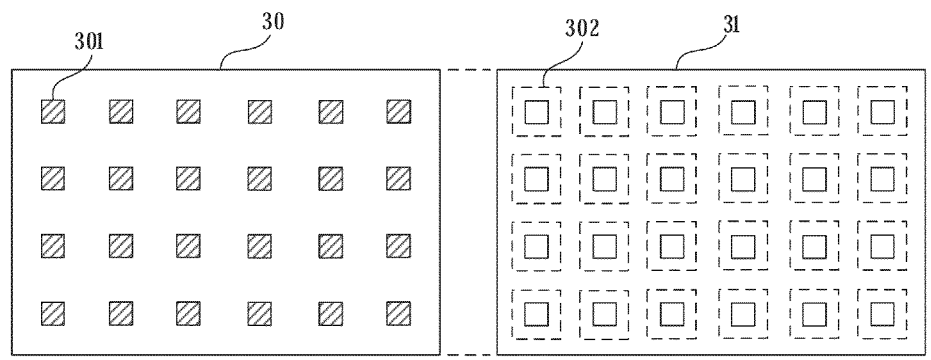
FIG. 3 is a diagram illustrating a method of setting a template and a search range used in template matching.

In step S203, the motion vector operating unit 104 performs a template matching process using the image data 122 subjected to the normalization for the short-exposure image and the intermediate-exposure image to operate the motion vector 123. A method of setting the template and the search range used in the template matching is illustrated in FIG. 3.

In step S203, the short-exposure image is used as a reference image serving as a reference coordinate system of the position alignment, and the intermediate-exposure image is used as a position alignment target image for obtaining a positional deviation amount with respect to the reference image. Here, a plurality of templates 301 are set in the reference image 30 in a grid shape, and a plurality of search ranges 302 are set in the position alignment target image 31 in a grid shape. The search range 302 has a predetermined size including the template 301. Since a template matching known in the art may be employed, description thereof will not be provided in detail. A matching index value is operated by shifting the template 301 of the reference image 30 within the search range 302 of the position alignment target image 31 to search a position where the matching index value is maximized (or minimized depending on a type of the matching index value).

Figure 4:
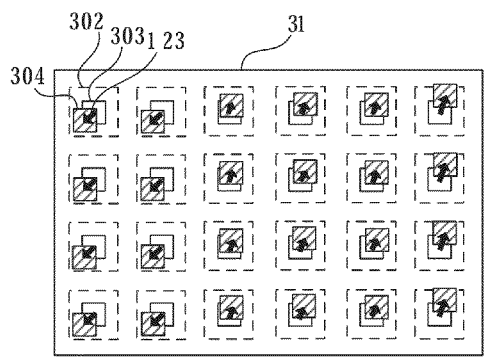
FIG. 4 is a diagram illustrating an exemplary motion vector obtained through the template matching.

FIG. 4 is a diagram illustrating an exemplary motion vector obtained through the template matching. In the position alignment target image 31, a template position 304 where the matching index value is maximized (or minimized depending on a type of the matching index value) is obtained. A positional deviation amount between the obtained template position 304 and the set position 303 of the template is obtained as a motion vector 123. The motion vector 123 is obtained for each set template 301.

In step S203, the motion vector operating unit 104 obtains data representing a distribution of the positional deviation amount and the matching index value between images as the intermediate data 124 of the motion vector operation. The obtained motion vector 123 and the obtained intermediate data 124 of the motion vector operation are stored in the frame memory 102.

In step S204, the motion vector reliability determination processing unit 105 determines reliability of the obtained motion vector 123 using the intermediate data 124 of the motion vector operation. In areas such as a low-contrast image area or a repetitive pattern area, it is difficult to obtain the motion vector 123 with high precision. In this regard, the reliability representing how much the motion vector 123 obtained in step S203 is reliable is determined. A method of determining the reliability of the motion vector 123 will be described with reference to FIG. 5.

Figure 5:
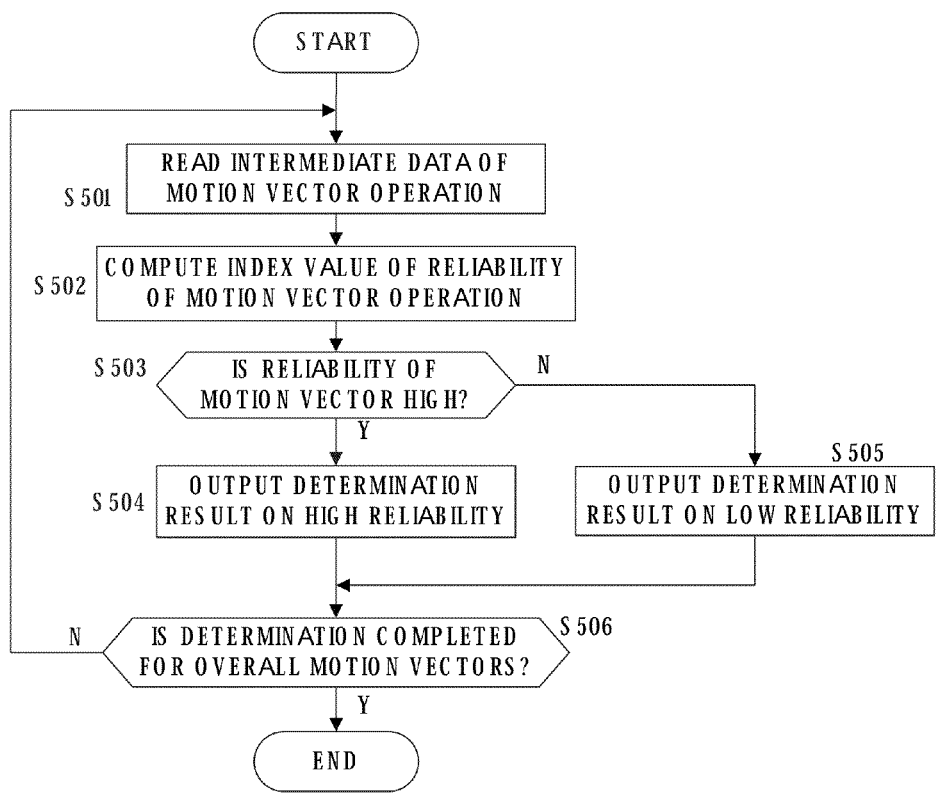
FIG. 5 is a flowchart illustrating details of a motion vector reliability determination process performed by the motion vector reliability determination processing unit.

FIG. 5 is a flowchart illustrating details of the motion vector reliability determination process performed by the motion vector reliability determination processing unit 105.

In step S501, the intermediate data 124 of the motion vector operation obtained in step S203 is read from the frame memory 102.

In step S502, an index value for quantifying reliability for each motion vector is computed using the intermediate data 124 of the motion vector operation. Specifically, an index value for quantifying reliability is computed using the characteristics (1) to (3) as follows.

(1) In an area where an edge is sharp, the reliability of the motion vector is high. In this case, the matching index value has a high value (or low value depending on a type of the index value), which means that the matching level is high, when the positional deviation can be eliminated. However, in a case where the positional deviation remains, the matching index value has a low value (or high value depending on a type of the index value). Therefore, the matching index value significantly changes when the template matching is performed.

(2) In a texture or a flat structure, a change of the matching index value is insignificant between a case where the positional deviation is eliminated and a case where the positional deviation remains, and reliability is low.

(3) In a repetitive structure, the matching index value periodically changes, and reliability is low.

However, as the index value for determining the reliability, any index value can be employed if it can detect an area having a little clue for the position alignment such as a low-contrast area or a repetitive pattern area. For example, as disclosed in JP3164121B, the index value of the reliability may be defined base on the amount of edges in each block.

In step S503, a reliability level is determined through 2 steps by comparing the index value of the motion vector reliability obtained in step S502 with a predetermined threshold value. The predetermined threshold value is a threshold value for determining the motion vector reliability and is set to a suitable value in advance. If it is determined that the reliability is high, the process advances to step S504. If it is determined that the reliability is low, the process advances to step S505.

In step S504, a determination result that the reliability of the motion vector 123 is high is stored in the frame memory 102.

Meanwhile, in step S505, a determination result that the reliability of the motion vector 123 is low is stored in the frame memory 102.

In step S506, it is determined whether or not the reliability determination process is completed for overall motion vectors. If it is determined that the reliability determination process is not completed for overall motion vectors, the process returns to step S501, and the reliability determination process is performed for unprocessed motion vectors. Meanwhile, if it is determined that the reliability determination process is completed for overall motion vectors, the process advances to step S205 in the flowchart of FIG. 2.

In steps S205 to S208, a process of obtaining a motion vector representing a positional deviation amount between the short-exposure image and the long-exposure image is performed.

In step S205, the normalization processing unit 103 operates a ratio of the exposure time between the long-exposure image and the short-exposure image using the shooting parameters 121 at the time of shooting and performs a normalization process for matching signal levels of the short-exposure image and the long-exposure image by multiplying a factor corresponding to the ratio of the exposure time by each pixel value of the short-exposure image. The image subjected to the normalization process is stored in the frame memory 102.

In step S206, the motion vector operating unit 104 performs template matching by using the short-exposure image as a reference image and using the long-exposure image as the position alignment target image to obtain a motion vector between both the images. Since this process is similar to the process of step S203, description thereof will not be repeated.

In step S207, the motion vector reliability determination processing unit 105 determines the reliability level of the motion vector obtained in step S206 through two steps.

In step S208, the motion vector correcting unit 106 performs a substitution process for the motion vector having reliability determined to be low in step S207 based on the result of the position alignment process between the short-exposure image and the intermediate-exposure image.

Figure 6:
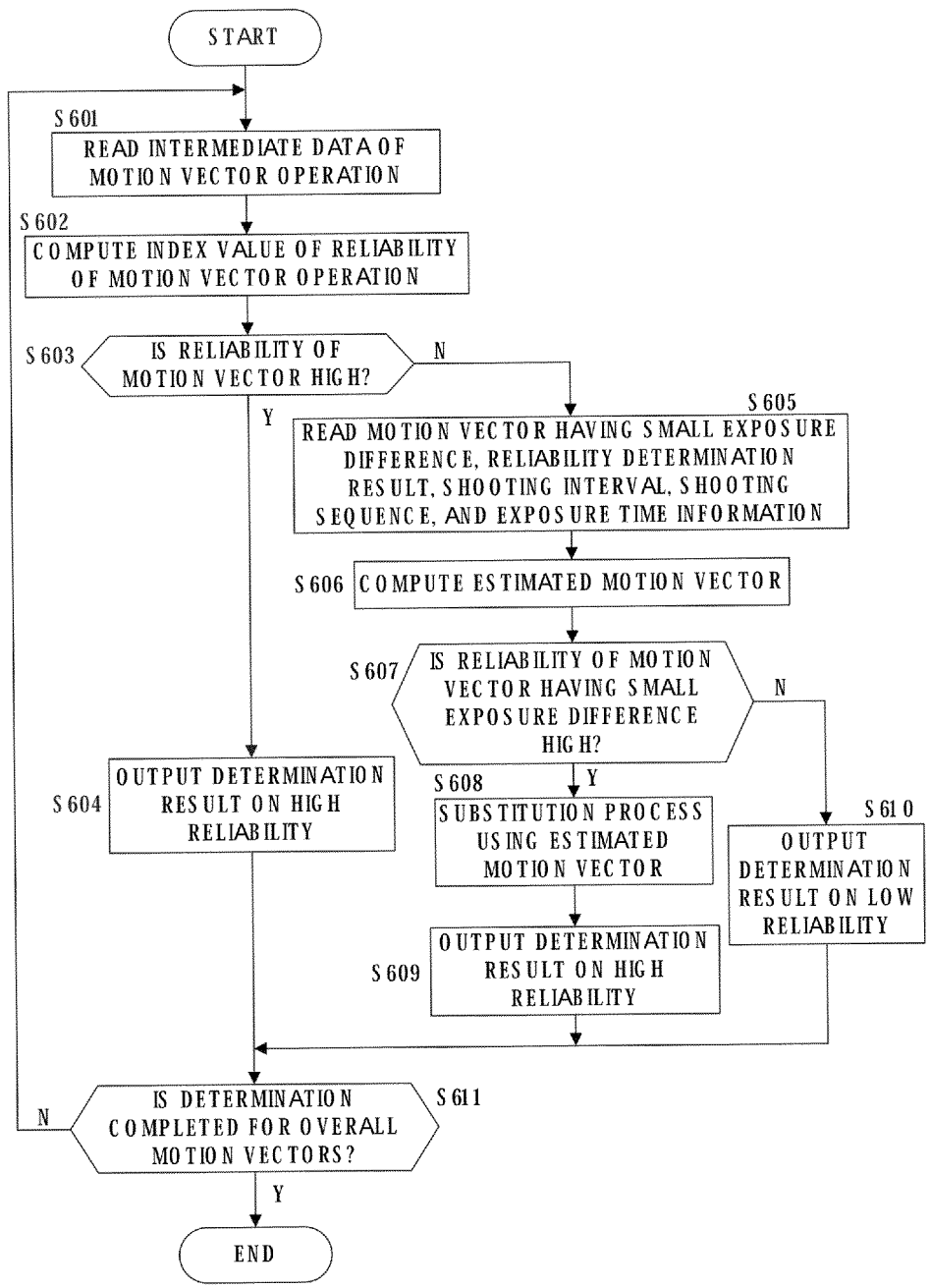
FIG. 6 is a flowchart illustrating details of the process performed in steps S207 and S208 of FIG. 5.

FIG. 6 is a flowchart illustrating details of steps S207 and S208 in the flowchart of FIG. 5.

In step S601, the intermediate data 124 of the motion vector operation obtained in step S206 of FIG. 2 is read from the frame memory 102.

In step S602, using the intermediate data 124 of the motion vector operation, an index value for quantifying the reliability is computed for each motion vector. This process is similar to the process of step S502 of FIG. 5.

In step S603, the reliability level is determined through two steps by comparing the index value of the motion vector reliability obtained in step S602 with a predetermined threshold value. If it is determined that the reliability is high, the process advances to step S604. If it is determined that the reliability is low, the process advances to step S605.

In step S604, the motion vector determined to have high reliability is directly output and is stored in the frame memory 102.

Meanwhile, in step S605, the motion vector between the short-exposure image and the intermediate-exposure image obtained in steps S202 to S204, the reliability determination result of the motion vector, and information on the shooting interval, the shooting sequence, and the exposure time are read from the frame memory 102.

In step S606, an estimated motion vector between the short-exposure image and the long-exposure image is computed using the shooting interval, the shooting sequence, and the motion vector between the short-exposure image and the intermediate-exposure image.

Figure 7:
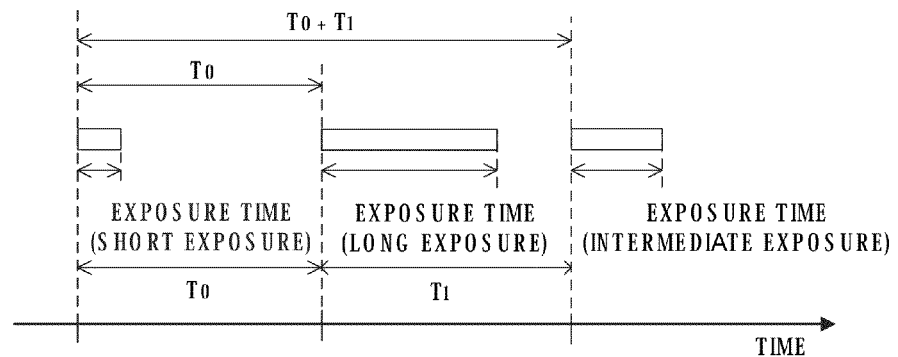
FIG. 7 is a diagram illustrating a method of computing an estimated motion vector.

FIG. 7 is a diagram illustrating a method of computing the estimated motion vector. According to the first embodiment, the continuous shooting is performed in orders of the short-exposure image, the long-exposure image, and the intermediate-exposure image, and the motion vector between the short-exposure image and the intermediate-exposure image is obtained in advance in steps S202 to S204 of FIG. 2. Assuming that "$T_0$" denotes the shooting interval between the short-exposure image and the long-exposure image, "$T_1$" denotes a shooting interval between the long-exposure image and the intermediate-exposure image, and a blur caused by handshaking or an object movement is constant during a shooting duration for the short-exposure image and the intermediate-exposure image, the estimated motion vector between the short-exposure image and the long-exposure image is expressed in following Equation (4) based on the ratio of the shooting interval.

$$\vec{V}'_L = \frac{T_0}{T_0 + T_1} \cdot \vec{V}_M, \qquad (4)$$

where $\vec{V}_M$ denotes the motion vector between the short-exposure image and the intermediate-exposure image, and $\vec{V}_L^T$ denotes the estimated motion vector between the short-exposure image and the long-exposure image.

In the computation method of FIG. 7, a representative time of the captured image is set to an exposure start time.

Figure 8:
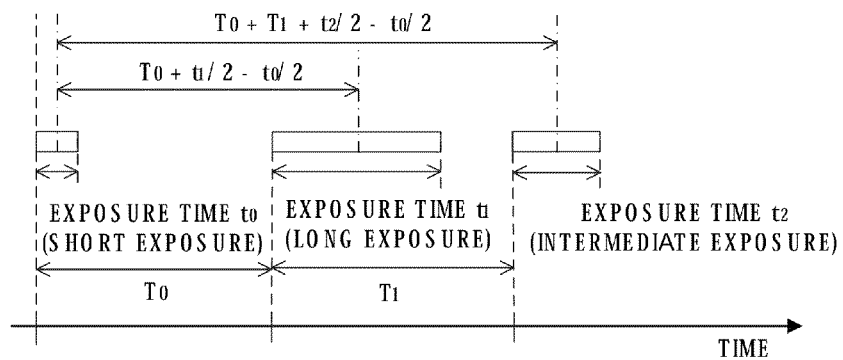
FIG. 8 is a diagram illustrating another method of computing an estimated motion vector.

FIG. 8 is a diagram illustrating another method of computing an estimated motion vector. In the computation example of FIG. 8, a representative time of the captured image is set to a center of the exposure duration, and the modeling is performed more strictly in terms of time. Assuming that "$t_0$," "$t_1$," and "$t_2$" denotes exposure times of the short-exposure image, the long-exposure image, and the intermediate-exposure image, respectively, "$T_0$" denotes a shooting interval between the short-exposure image and the long-exposure image, "$T_1$" denotes a shooting interval between the long-exposure image and the intermediate-exposure image, and a blur caused by handshaking or an object movement is constant during the shooting duration for the short-exposure image and the intermediate-exposure image, the estimated motion vector between the short-exposure image and the long-exposure image is expressed in following Equation (5) based on the ratio of the shooting interval.

$$\vec{V}'_L = \frac{T_0 + t_1/2 - t_0/2}{T_0 + T_1 + t_2/2 - t_0/2} \cdot \vec{V}_M, \qquad (5)$$

where $\vec{V}_M$ denotes the motion vector between the short-exposure image and the intermediate-exposure image, and $\vec{V}_L^T$ denotes the estimated motion vector between the short-exposure image and the long-exposure image.

In step S607, it is determined whether or not the motion vector corresponding to the motion vector determined to have low reliability in step S603 out of motion vectors between the short-exposure image and the intermediate-exposure image has high reliability. The motion vector corresponding to the motion vector determined to have low reliability in step S603 is a motion vector having the same position as that of the set template. If it is determined that the motion vector has high reliability, the process advances to step S608.

In step S608, since the motion vector between the short-exposure image and the intermediate-exposure image has high reliability, it is determined that the estimated motion vector between the short-exposure image and the long-exposure image obtained in step S606 is also reliable, so that a process of substituting the estimated motion vector is performed. That is, the motion vector between the long-exposure image and the short-exposure image determined to have low reliability in step S603 is substituted with the estimated motion vector obtained in step S606.

In step S609, a determination result that the motion vector has high reliability is stored in the frame memory 102.

Meanwhile, in step S607, if it is determined that the motion vector corresponding to the motion vector determined to have low reliability in step S603 out of the motion vectors between the short-exposure image and the intermediate-exposure image has low reliability, the process advances to step S610. In step S610, a determination result that the motion vector has low reliability is stored in the frame memory 102.

In step S611, it is determined whether or not the process of steps S601 to S603 is performed for overall motion vectors. If it is determined that the process is not completed for overall motion vectors, the process returns to step S601, and the process subsequent to step S601 is performed for the unprocessed motion vectors. Otherwise, if it is determined that the process is completed for overall motion vectors, the process advances to step S209 of the flowchart of FIG. 2.

In step S209, the synthesis processing unit 107 corrects a positional deviation between the short-exposure image and the intermediate-exposure image based on the motion vector obtained in steps S202 to S204 and synthesizes the short-exposure image and the intermediate-exposure image whose positional deviation is corrected to create a synthesized image having a wide dynamic range. The synthesis ratio between the images is determined based on a pair of factors including a synthesis ratio factor corresponding to the luminance value and a synthesis ratio factor corresponding to the luminance difference between the long-exposure image and the short-exposure image.

Figure 9:
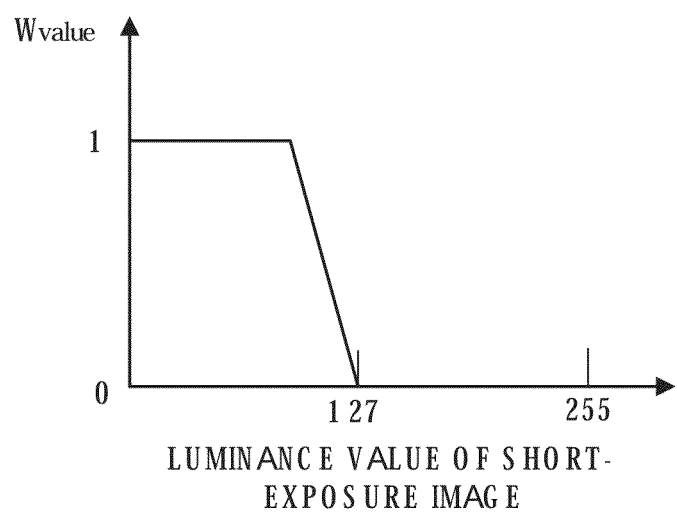
FIG. 9 is a diagram illustrating a method of determining a synthesis ratio depending on a luminance value.

FIG. 9 is a diagram illustrating a method of determining the synthesis ratio corresponding to the luminance value. In FIG.

9, the abscissa denotes a luminance value of the short-exposure image, and the ordinate denotes a synthesis ratio factor $W_{value}$ of the long-exposure image or the intermediate-exposure image corresponding to the luminance value. In addition, a minimum of the luminance value is set to 0, and a maximum of the luminance value is set to 255. Furthermore, a minimum of the synthesis ratio factor $W_{value}$ is set to 0, and a maximum of the synthesis ratio factor $W_{value}$ is set to 1.

Control is performed such that a shadow noise is suppressed by increasing a synthesis ratio of the intermediate-exposure image or the long-exposure image as a synthesis target in a low luminance area, and a highlight phenomenon (saturation) is suppressed by increasing a synthesis ratio of the short-exposure image in a high luminance area. Therefore, as illustrated in FIG. 9, while the synthesis ratio factor $W_{value}$ increases in a low luminance area, the synthesis ratio factor $W_{value}$ decreases in a high luminance area.

In FIG. 9, a relationship between the luminance value of the short-exposure image and the synthesis ratio factor $W_{value}$ is defined. However, alternatively, a relationship between the luminance value of the long-exposure image and the synthesis ratio factor $W_{value}$ may be defined.

Figure 10A:
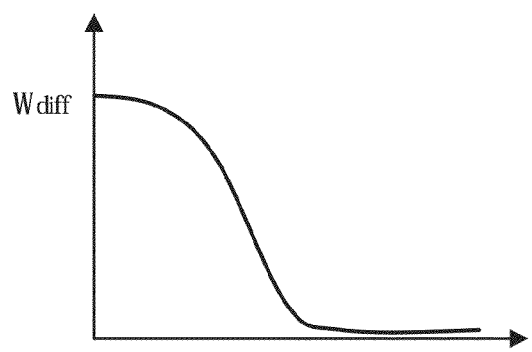
FIG. 10A is a diagram illustrating a method of determining a synthesis ratio depending on a luminance difference between a long-exposure image and a short-exposure image in a case where it is determined that a motion vector has high reliability.
Figure 10B:
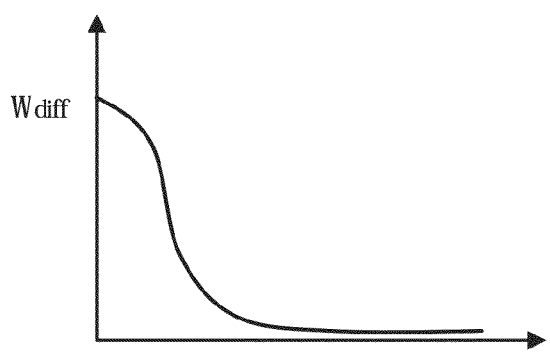
FIG. 10B is a diagram illustrating a method of determining a synthesis ratio depending on a luminance difference between a long-exposure image and a short-exposure image in a case where it is determined that a motion vector has low reliability.

FIGS. 10A and 10B are diagrams illustrating a method of determining the synthesis ratio corresponding to the luminance difference between the long-exposure image and the short-exposure image. FIG. 10A illustrates a case where it is determined that the motion vector has high reliability, and FIG. 10B illustrates a case where it is determined that the motion vector has low reliability. In FIGS. 10A and 10B, the abscissa denotes a luminance difference between the short-exposure image and the long-exposure image (or intermediate-exposure image) subjected to the normalization, and the ordinate denotes a synthesis ratio $W_{diff}$ of the long-exposure image (or intermediate-exposure image) corresponding to the luminance difference.

As illustrated in FIGS. 10A and 10B, in a case where the luminance difference is small, the synthesis ratio factor $W_{diff}$ increases. In a case where the luminance difference is large, the synthesis ratio factor $W_{diff}$ decreases. According to the present embodiment, the short-exposure image is used as the reference image. Therefore, in a case where the luminance difference is small, the synthesis ratio factor $W_{diff}$ increases, so that synthesis with the long-exposure image is promoted. In a case where the luminance difference is large, the synthesis ratio factor $W_{diff}$ decreases, so that synthesis with the long-exposure image is suppressed. Similarly, in a case where the long-exposure image is used as the reference image, the synthesis ratio factor $W_{diff}$ is set such that the synthesis is promoted for a smaller luminance difference, and the synthesis is suppressed for a large luminance difference.

Here, in an area where the motion vector has high reliability, the synthesis ratio factor $W_{diff}$ relatively smoothly decreases as the luminance difference increases (refer to FIG. 10A). Meanwhile, in an area where the motion vector has low reliability, the synthesis ratio factor $W_{diff}$ relatively abruptly decreases as the luminance difference increases (refer to FIG. 10B). That is, even when the luminance difference is equal, the synthesis ratio factor $W_{diff}$ in the area where the motion vector has low reliability is set to be lower than that of the area where the motion vector has high reliability in order to suppress the synthesis.

In a case where an object moves during the continuous shooting, it is difficult to obtain a suitable motion vector in a repetitive pattern area, a low contrast area, or the like. If the synthesis process is performed while a suitable matching point is not obtained, an artifact such as a ghost image may be generated. In this regard, it is possible to suppress generation of the artifact by setting the synthesis ratio factor $W_{diff}$ of the long-exposure image corresponding to the luminance difference depending on a reliability level of the motion vector.

Using the synthesis ratio factors $W_{diff}$ and $W_{value}$ obtained through the aforementioned method, a synthesis ratio $W_{long}$ of the long-exposure image and a synthesis ratio $W_{short}$ of the short-exposure image are obtained based on following Equation (6).

$$W_{long} = W_{value} \times W_{diff}$$

$$W_{short} = 1 - W_{long} \quad (6)$$

Assuming that "$P_{long}$" denotes a signal value of the long-exposure image, and "$P_{short}$" denotes a signal value of the short-exposure image, a signal value add of P the synthesized image is given in following Equation (7).

$$P_{add} = W_{long} \cdot P_{long} + W_{short} \cdot P_{short} \quad (7)$$

Through the process described above, it is possible to obtain a synthesized image having a wide dynamic range.

In step S210 of FIG. 2, the synthesis processing unit 107 corrects a positional deviation between the long-exposure image and the synthesized image created in step S209 using the motion vector obtained in steps S205 to S208 and synthesizes the long-exposure image and the synthesized image subjected to correction of the positional deviation. A method of synthesizing the image is similar to that performed in step S209. In addition, in step S209, a positional deviation of the intermediate-exposure image is corrected with respect to the short-exposure image. Therefore, the motion vector between the short-exposure image and the long-exposure image is equal to the motion vector between the long-exposure image and the synthesized image obtained by synthesizing the short-exposure image and the intermediate-exposure image. Accordingly, it is possible to correct a positional deviation between the long-exposure image and the synthesized image created in step S209 using the motion vector between the long-exposure image and the short-exposure image obtained in steps S205 to S208.

In step S211, the image processing unit 108 performs a developing process for allocating an R, G, or B signal to each pixel of the synthesized image data 127 obtained in the image synthesis process of step S210

Figure 11:
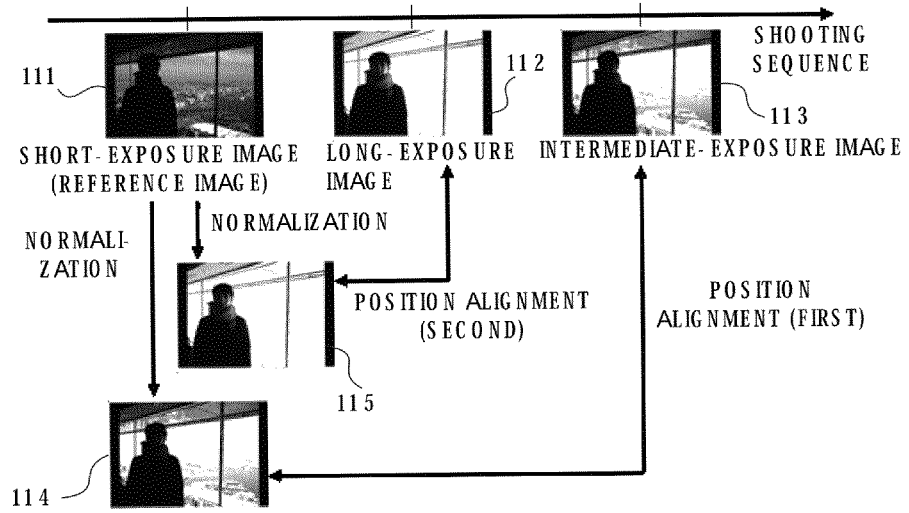
FIG. 11 is a diagram illustrating a relationship between a shooting sequence and a position alignment processing sequence according to the first embodiment.

FIG. 11 is a diagram illustrating a relationship between a shooting sequence and a position alignment processing sequence according to the first embodiment. As described above, the shooting is performed in orders of the short-exposure image 111, the long-exposure image 112, and the intermediate-exposure image 113. First, a normalization process for matching a signal level of the short-exposure image 111 and a signal level of the intermediate-exposure image 113 is performed to create an image 114 subjected to the normalization process, and a position alignment process between the image 114 subjected to the normalization process and the intermediate-exposure image 113 is performed. Then, a normalization process for matching a signal level of the short-exposure image 111 and a signal level of the long-exposure image 112 is performed to create an image 115 subjected to the normalization process, and a position alignment process between the image 115 subjected to the normalization process and the long-exposure image 112 is performed.

The image processing apparatus according to the first embodiment described above is an apparatus that obtains motion vectors between the short-exposure image, the long-exposure image, and the intermediate-exposure image obtained through continuous shooting under different exposure conditions. In a plurality of positions on the short-exposure image, a first motion vector as a motion vector between the short-exposure image and the long-exposure image is computed. In addition, in a plurality of positions on the short-exposure image where the first motion vector is computed, a second motion vector as a motion vector between the short-exposure image and the intermediate-exposure image is computed. In addition, a reliability level of the first motion vector and a reliability level of the second motion vector are determined, and an estimated motion vector between the short-exposure image and the long-exposure image is computed for a motion vector determined to have low reliability out of the first motion vectors computed in a plurality of positions on the short-exposure image based on a shooting interval between the images and the second motion vector computed in the corresponding position. In a case where the second motion vector computed in the position where it is determined that the first motion vector has low reliability has high reliability, the first motion vector determined to have low reliability is substituted with the estimated motion vector. As a result, even when the exposure difference between the short-exposure image and the long-exposure image is large, it is possible to obtain the estimated motion vector based on the motion vector between the intermediate-exposure image and the short-exposure image having high reliability and the shooting interval between the images as a motion vector between the short-exposure image and the long-exposure image. Therefore, it is possible to perform the position alignment with high precision.

Furthermore, a positional deviation between the short-exposure image and the intermediate-exposure image is corrected based on the second motion vector, and a pair of the images subjected to the correction of the positional deviation are synthesized. A positional deviation between the long-exposure image and the image synthesized using the short-exposure image and the intermediate-exposure image is corrected based on the first motion vector subjected to the substitution in a case where substitution of the estimated motion vector is performed or based on the computed first motion vector in a case where substitution is not performed. In addition, a synthesized image is created by synthesizing a pair of the images subjected to the correction of the positional deviation. As a result, it is possible to create an image having a wide dynamic range while an image blur is suppressed.

<Second Embodiment>

Figure 12:
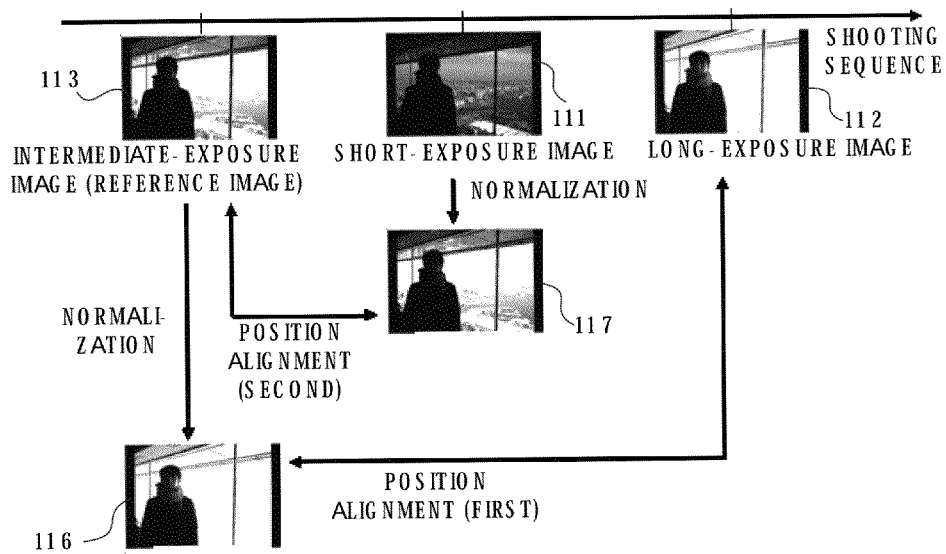
FIG. 12 is a diagram illustrating a relationship between a shooting sequence and a position alignment processing sequence according to a second embodiment.

FIG. 12 is a diagram illustrating a relationship between a shooting sequence and a position alignment processing sequence according to a second embodiment. According to the second embodiment, shooting is performed in orders of an intermediate-exposure image (intermediate-speed shutter), a short-exposure image (high-speed shutter), and a long-exposure image (low-speed shutter). It is assumed that the exposure difference (luminance difference) between the intermediate-exposure image and the short-exposure image is larger than the exposure difference (luminance difference) between the intermediate-exposure image and the long-exposure image.

Description will now be made for a position alignment processing sequence according to the second embodiment. According to the present embodiment, the intermediate-exposure image serves as a reference image of the position alignment.

First, a normalization process for matching a signal level of the intermediate-exposure image 113 and a signal level of the long-exposure image 112 is performed to create an image 116 subjected to the normalization process, and a position alignment process between the long-exposure image 112 and the image 116 subjected to the normalization process is performed. In addition, a normalization process for matching a signal level of the short-exposure image 111 and a signal level of the intermediate-exposure image 113 is performed to create an image 117 subjected to the normalization process, and a position alignment process between the intermediate-exposure image 113 and the image 117 subjected to the normalization process is performed.

The position alignment between the intermediate-exposure image 113 and the short-exposure image 111 is susceptible to a noise and has a high possibility that the obtained motion vector has low precision, compared to the position alignment between the intermediate-exposure image 113 and the long-exposure image 112. According to the present embodiment, a substitution process based on a result of the position alignment process between the intermediate-exposure image 113 and the long-exposure image 112 is performed for a motion vector determined to have low reliability out of motion vectors between the intermediate-exposure image 113 and the short-exposure image 111. A method of performing the substitution is similar to that of the first embodiment.

In the image processing apparatus according to the second embodiment described above, even in a case where shooting is performed in orders of the intermediate-exposure image, the short-exposure image, and the long-exposure image, and the exposure difference between the intermediate-exposure image and the short-exposure image is larger than the exposure difference between the intermediate-exposure image and the long-exposure image, it is possible to obtain the estimated motion vector based on the motion vector between the long-exposure image and the intermediate-exposure image having high reliability and the shooting interval between the images as a motion vector between the intermediate-exposure image and the short-exposure image. Therefore, it is possible to perform the position alignment with high precision.

<Third Embodiment>

Figure 13:
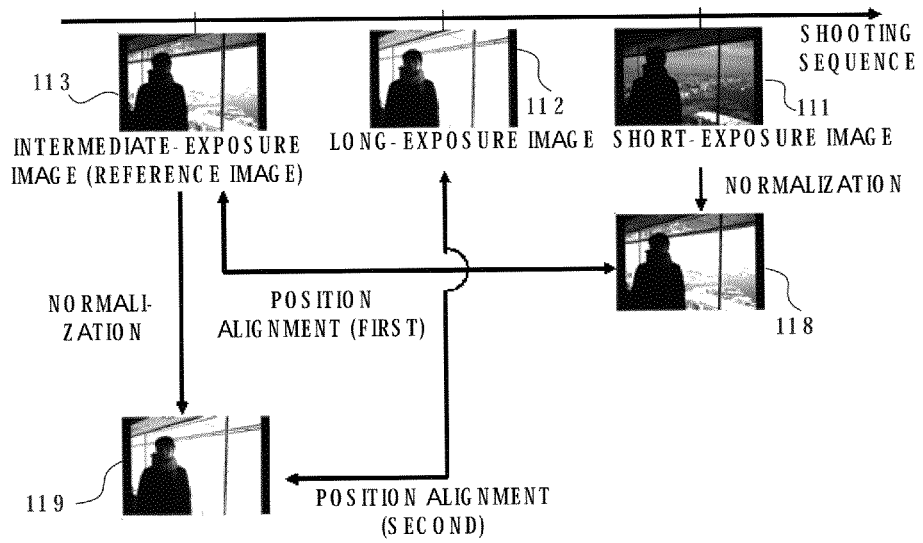
FIG. 13 is a diagram illustrating a relationship between a shooting sequence and a position alignment processing sequence according to a third embodiment.

FIG. 13 is a diagram illustrating a relationship between a shooting sequence and a position alignment processing sequence according to a third embodiment. According to the third embodiment, shooting is performed in orders of an intermediate-exposure image (intermediate-speed shutter), a long-exposure image (low-speed shutter), and a short-exposure image (high-speed shutter). It is assumed that an exposure difference (luminance difference) between the intermediate-exposure image and the long-exposure image is larger than an exposure difference (luminance difference) between the intermediate-exposure image and the short-exposure image.

Description will now be made for a position alignment processing sequence according to the third embodiment. According to the present embodiment, the intermediate-exposure image serves as a reference image of the position alignment.

First, a normalization process for matching a signal level of the short-exposure image 111 and a signal level of the intermediate-exposure image 113 to create an image 118 subjected to the normalization process, and a position alignment process between the image 118 subjected to the normalization process and the intermediate-exposure image 113 is performed. In addition, a normalization process for matching a signal level of the intermediate-exposure image 113 and a signal level of the long-exposure image 112 is performed to create an image 119 subjected to the normalization process, and a position alignment process between the image 119 subjected to the normalization process and the long-exposure image 112 is performed.

The position alignment between the intermediate-exposure image 113 and the long-exposure image 112 is susceptible to saturation and has a high possibility that the obtained motion vector has low precision, compared to a position alignment between the intermediate-exposure image 113 and the short-exposure image 111. According to the present embodiment, a substitution process based on a result of the position alignment process between the intermediate-exposure image 113 and the short-exposure image 111 is performed for a motion vector determined to have low reliability out of motion vectors between the intermediate-exposure image 113 and the long-exposure image 112. A method of performing the substitution is similar to that of the first embodiment.

In the image processing apparatus according to the third embodiment described above, even in a case where shooting is performed in orders of the intermediate-exposure image, the long-exposure image, and the short-exposure image, and the exposure difference between the intermediate-exposure image and the long-exposure image is larger than the exposure difference between the intermediate-exposure image and the short-exposure image, it is possible to obtain the estimated motion vector based on the motion vector between the short-exposure image and the intermediate-exposure image having high reliability and the shooting interval between the images as a motion vector between the intermediate-exposure image and the long-exposure image. Therefore, it is possible to perform the position alignment with high precision.

<Fourth Embodiment>

Figure 14:
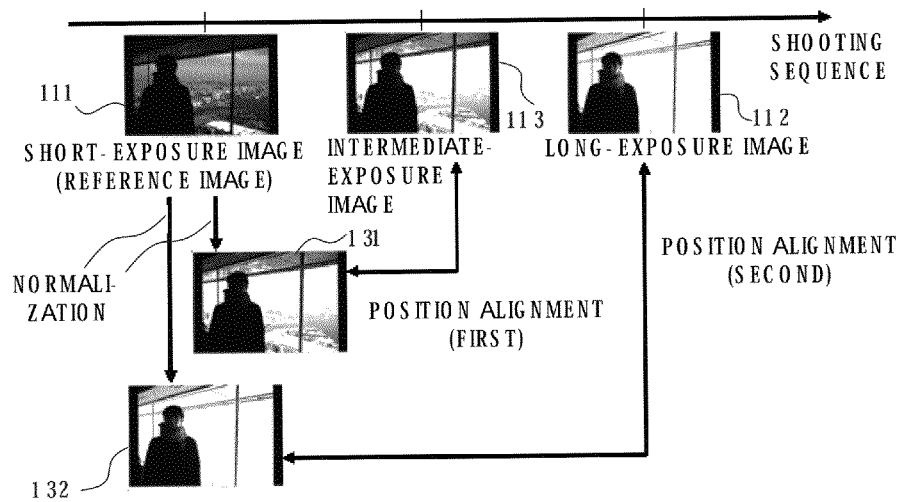
FIG. 14 is a diagram illustrating a relationship between a shooting sequence and a position alignment processing sequence according to a fourth embodiment.

FIG. 14 is a diagram illustrating a relationship between a shooting sequence and a position alignment processing sequence according to the fourth embodiment. According to the fourth embodiment, shooting is performed in orders of a short-exposure image (high-speed shutter), an intermediate-exposure image (intermediate-speed shutter), and a long-exposure image (low-speed shutter).

Description will now be made for a position alignment processing sequence according to the fourth embodiment. According to the present embodiment, the short-exposure image serves as a reference image of the position alignment.

First, a normalization process for matching a signal level of the short-exposure image 111 and a signal level of the intermediate-exposure image 113 is performed to create an image 131 subjected to the normalization process, and a position alignment process between the image 131 subjected to the normalization process and the intermediate-exposure image 113 is performed. In addition, a normalization process for matching a signal level of the short-exposure image 111 and a signal level of the long-exposure image 112 is performed to create an image 132 subjected to the normalization process, and a position alignment process between the long-exposure image 112 and the image 132 subjected to the normalization process is performed.

The position alignment between the short-exposure image 111 and the long-exposure image 112 is susceptible to non-linearity of a sensor and has a high possibility that the obtained motion vector has low precision, compared to the position alignment between the short-exposure image 111 and the intermediate-exposure image 113. According to the present embodiment, a substitution process based on a result of the position alignment process between the short-exposure image 111 and the intermediate-exposure image 113 is performed for a motion vector determined to have low reliability out of motion vectors between the short-exposure image 111 and the long-exposure image 112. A method of performing the substitution is similar to that of the first embodiment. However, a method of computing the estimated motion vector is different from that of the first embodiment. Therefore, description will now be made for the method of computing an estimated motion vector according to the fourth embodiment.

Figure 15:
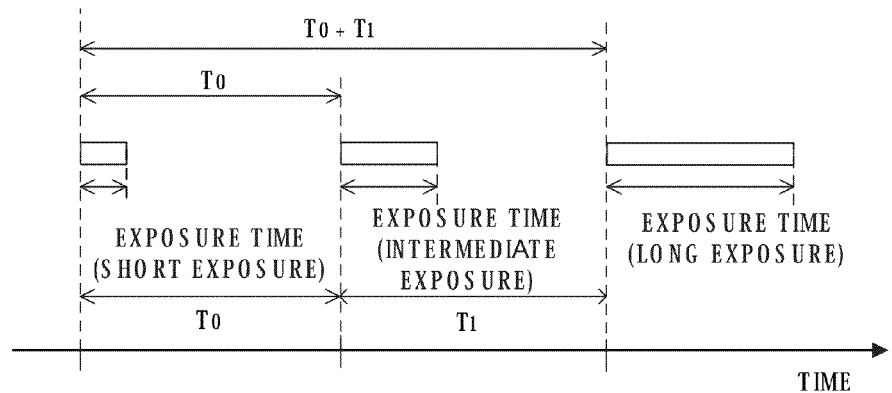
FIG. 15 is a diagram illustrating a method of computing an estimated motion vector according to the fourth embodiment.

FIG. 15 is a diagram illustrating a method of computing an estimated motion vector according to the fourth embodiment. According to the fourth embodiment, continuous shooting is performed in orders of a short-exposure image, an intermediate-exposure image, and a long-exposure image, and a motion vector between the short-exposure image and the intermediate-exposure image is first obtained. Assuming that "$T_0$" denotes a shooting interval between the short-exposure image and the intermediate-exposure image, "$T_1$" denotes a shooting interval between the intermediate-exposure image and the long-exposure image, and a blur caused by handshaking or an object movement is constant during the shooting duration for the short-exposure image and the long-exposure image, an estimated motion vector between the short-exposure image and the long-exposure image is expressed as following Equation (8) based on a ratio of the shooting interval.

$$\vec{V_L'} = \frac{T_0 + T_1}{T_0} \cdot \vec{V_M}, \qquad (8)$$

where $\vec{V_M}$ denotes a motion vector between the short-exposure image and the intermediate-exposure image, and $\vec{V_L}^T$ denotes an estimated motion vector between the short-exposure image and the long-exposure image.

In the computation method of Equation (8), a representative time of the captured image is set to an exposure start time.

Figure 16:
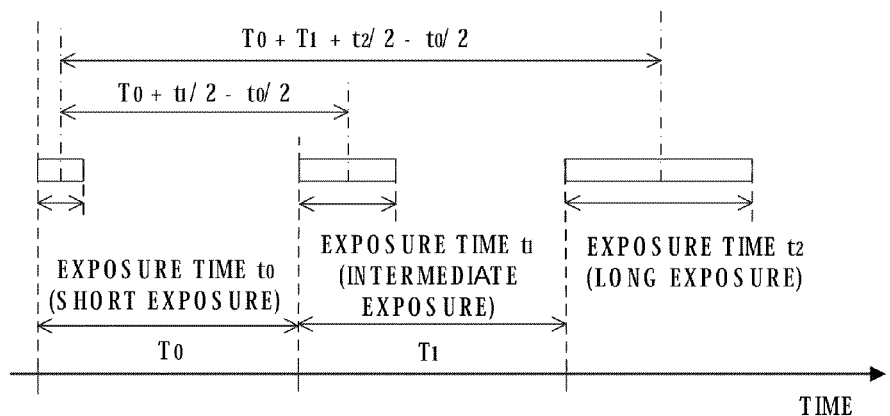
FIG. 16 is a diagram illustrating another method of computing an estimated motion vector according to the fourth embodiment.

FIG. 16 is a diagram illustrating another method of computing an estimated motion vector. In the computation example of FIG. 16, a representative time of the captured image is set to a center of the exposure duration, and the modeling is performed more strictly in terms of time. Assuming that "$t_0$," "$t_1$," and "$t_2$" denote exposure times of the short-exposure image, the intermediate-exposure image, and the long-exposure image, respectively, "$T_0$" denotes a shooting interval between the short-exposure image and the intermediate-exposure image, "$T_1$" denotes a shooting interval between the long-exposure image and the intermediate-exposure image, and a blur caused by handshaking or an object movement is constant during the shooting duration for the short-exposure image and the long-exposure image, the estimated motion vector between the short-exposure image and the long-exposure image is expressed as following Equation (9) based on the ratio of the shooting interval.

$$\vec{V_L'} = \frac{T_0 + T_1 + t_2/2 - t_0/2}{T_0 + t_1/2 - t_0/2} \cdot \vec{V_M}, \qquad (9)$$

where $\vec{V_M}$ denotes a motion vector between the short-exposure image and the intermediate-exposure image; and $\vec{V_L}^T$ denotes an estimated motion vector between the short-exposure image and the long-exposure image.

In the image processing apparatus according to the fourth embodiment described above, even in a case where shooting is performed in orders of the short-exposure image, the intermediate-exposure image, and the long-exposure image, and the exposure difference between the short-exposure image and the long-exposure image is large, it is possible to obtain the estimated motion vector based on the motion vector between the intermediate-exposure image and the short-exposure image having high reliability and the shooting interval between the images as a motion vector between the short-exposure image and the long-exposure image. Therefore, it is possible to perform the position alignment with high precision.

<Fifth Embodiment>

Figure 17:
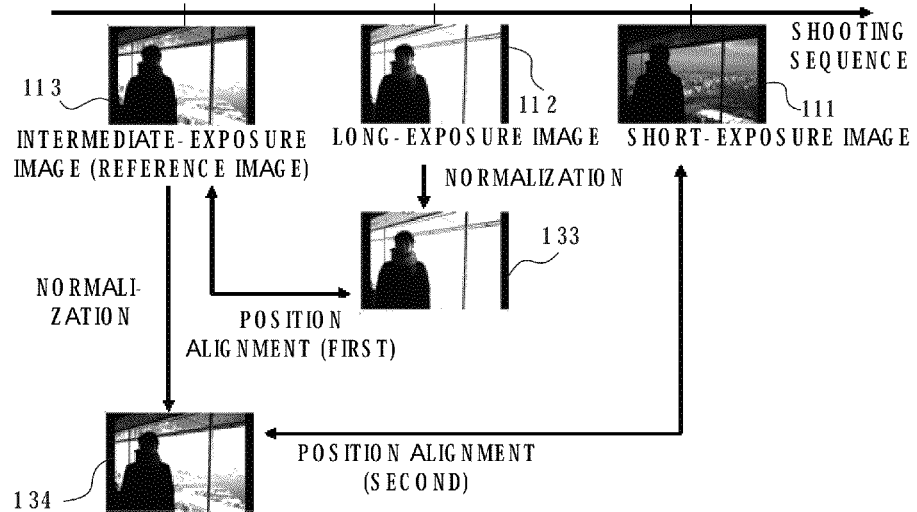
FIG. 17 is a diagram illustrating a relationship between a shooting sequence and a position alignment processing sequence according to a fifth embodiment.

FIG. 17 is a diagram illustrating a relationship between a shooting sequence and a position alignment processing sequence according to a fifth embodiment. According to the fifth embodiment, shooting is performs in orders of an intermediate-exposure image (intermediate-speed shutter), a long-exposure image (low-speed shutter), and a short-exposure image (high-speed shutter). It is assumed that an exposure difference (luminance difference) between the intermediate-exposure image and the short-exposure image is larger than an exposure difference (luminance difference) between the intermediate-exposure image and the long-exposure image.

Description will now be made for a position alignment processing sequence according to the fifth embodiment. According to the present embodiment, the intermediate-exposure image serves as a reference image of the position alignment.

First, a normalization process for matching a signal level of the intermediate-exposure image 113 and a signal level of the long-exposure image 112 is performed to create an image 133 subjected to the normalization process, and a position alignment process between the long-exposure image 112 and the image 133 subjected to the normalization process is performed. In addition, a normalization process for matching a signal level of the short-exposure image 111 and a signal level of the intermediate-exposure image 113 is performed to create an image 134 subjected to the normalization process, and a position alignment process between the intermediate-exposure image 113 and the image 134 subjected to the normalization process is performed.

The position alignment between the intermediate-exposure image 113 and the short-exposure image 111 is susceptible to a noise and has a high possibility that the obtained motion vector has low precision, compared to the position alignment between the intermediate-exposure image 113 and the long-exposure image 112. According to the present embodiment, a substitution process based on a result of the position alignment process between the intermediate-exposure image 113 and the long-exposure image 112 is performed for a motion vector determined to have low reliability out of motion vectors between the intermediate-exposure image 113 and the short-exposure image 111. A method of the substitution process is similar to that of the first embodiment. In addition, the method of computing the estimated motion vector is similar to that of the fourth embodiment.

In the image processing apparatus according to the fifth embodiment described above, even in a case where shooting is performed in orders of the intermediate-exposure image, the long-exposure image, and the short-exposure image, and the exposure difference between the intermediate-exposure image and the short-exposure image is larger than the exposure difference between the intermediate-exposure image and the long-exposure image, it is possible to obtain the estimated motion vector based on the motion vector between the long-exposure image and the intermediate-exposure image having high reliability and the shooting interval between the images as a motion vector between the intermediate-exposure image and the short-exposure image. Therefore, it is possible to perform the position alignment with high precision.

<Sixth Embodiment>

Figure 18:
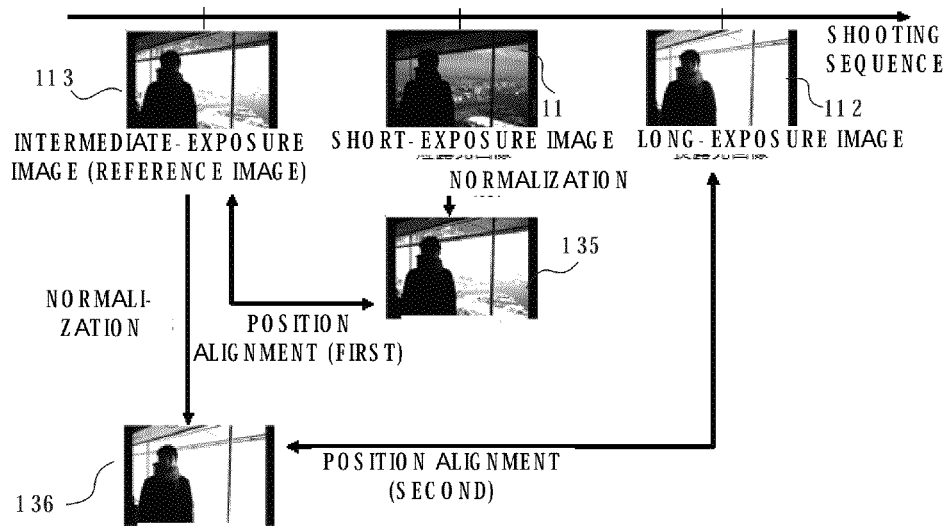
FIG. 18 is a diagram illustrating a relationship between a shooting sequence and a position alignment processing sequence according to a sixth embodiment.

FIG. 18 is a diagram illustrating a relationship between a shooting sequence and a position alignment processing sequence according to a sixth embodiment. According to the sixth embodiment, shooting is performed in orders of the intermediate-exposure image (intermediate-speed shutter), a short-exposure image (high-speed shutter), and a long-exposure image (low-speed shutter). It is assumed that an exposure difference (luminance difference) between the intermediate-exposure image and the long-exposure image is larger than an exposure difference (luminance difference) between the intermediate-exposure image and the short-exposure image.

Description will now be made for a position alignment processing sequence according to the sixth embodiment. According to the present embodiment, the intermediate-exposure image serves as a reference image of the position alignment.

First, a normalization process for matching a signal level of the short-exposure image 111 and a signal level of the intermediate-exposure image 113 is performed to create an image 135 subjected to the normalization process, and a position alignment process between the intermediate-exposure image 113 and the image 135 subjected to the normalization process is performed. In addition, a normalization process for matching a signal level of the intermediate-exposure image 113 and a signal level of the long-exposure image 112 is performed to create an image 136 subjected to the normalization process, and a position alignment process between the long-exposure image 112 and the image 136 subjected to the normalization process is performed.

The position alignment between the intermediate-exposure image 113 and the long-exposure image 112 is susceptible to saturation and has a high possibility that the obtained motion vector has low precision, compared to a position alignment between the intermediate-exposure image 113 and the short-exposure image 111. According to the present embodiment, a substitution process based on a result of the position alignment process between the intermediate-exposure image 113 and the short-exposure image 111 is performed for a motion vector determined to have low reliability out of motion vectors between the intermediate-exposure image 113 and the long-exposure image 112. A method of performing the substitution is similar to that of the first embodiment. In addition, a method of computing the estimated motion vector is similar to that of the fourth embodiment.

In the image processing apparatus according to the sixth embodiment described above, even in a case where shooting is performed in orders of the intermediate-exposure image, the short-exposure image, and the long-exposure image, and the exposure difference between the intermediate-exposure image and the long-exposure image is larger than that of the intermediate-exposure image and the short-exposure image, it is possible to obtain the estimated motion vector based on the motion vector between the short-exposure image and the intermediate-exposure image having high reliability and the shooting interval between the images as a motion vector between the intermediate-exposure image and the long-exposure image. Therefore, it is possible to perform the position alignment with high precision.

In the description of the first to sixth embodiments described above, it is assumed that the process performed by the image processing apparatus is based on a hardware process. However, the invention is not necessarily limited thereto. For example, a software process may be performed using a computer. In this case, the computer has a main storage device, such as a central processing unit (CPU) or a random access memory (RAM), and a computer readable storage medium (storage device) where a program for entirely or partly implementing the aforementioned processes. Herein, this program is referred to as an image processing program. Furthermore, processing similar to the aforementioned image processing apparatus is implemented by causing the CPU to read the image processing program stored in the storage medium and execute information processing or operation.

Here, a computer readable storage medium may include a magnetic disc, an opto-magnetic disc, a compact disc read-only memory (CD-ROM), a digital versatile disc read-only memory (DVD-ROM), a semiconductor memory, and the like. Alternatively, the image processing program may be transmitted via a communication network and may be executed by a computer receiving the image processing program.

The invention is not limited to the embodiments described above, but may be embodied in various forms by modifying elements in applications without departing from the spirit and scope of the invention. A plurality of elements disclosed in the embodiments described above may be suitably combined to provide various modifications of the invention. For example, the elements described in the embodiments may be omitted partly or entirely.

Although description has been made by employing a digital camera as a camera having the image processing apparatus in the aforementioned embodiments, any imaging device may be employed if it can create a synthesized image by synthesizing a plurality of images obtained through continuous shooting. For example, the camera may include a video camera, a movie camera, a camera integrated into a mobile phone, a personal digital assist (PDA), and a game machine, and the like.

Although description has been made for an example in which a synthesized image having a wide dynamic range is created by synthesizing three images including a short-exposure image, a long-exposure image, and an intermediate-exposure image, the synthesized image having a wide dynamic range may be created by synthesizing four or more images. Even in this case, the position alignment method and the synthesizing method described in the aforementioned embodiments may be employed when three images out of the four or more images are synthesized.

What is claimed is:

1. An image processing apparatus that obtains a motion vector between at least three images, including first, second, and third images obtained through continuous shooting under different exposure conditions in which an exposure amount difference between the first and second images is larger than that between the first and third images, the image processing apparatus comprising:
a first motion vector computing unit that is configured to compute first motion vectors as motion vectors between the first and second images in a plurality of positions on the first image;
a second motion vector computing unit that is configured to compute second motion vectors as motion vectors between the first and third images in the plurality of positions on the first image where the first motion vectors are computed;
a first reliability determining unit that is configured to determine a reliability level of the first motion vectors;
a second reliability determining unit that is configured to determine a reliability level of the second motion vectors;
an estimated motion vector computing unit that is configured to compute an estimated motion vector between the first and second images for a motion vector determined to have low reliability out of the first motion vectors computed in the plurality of positions on the first image based on a second motion vector computed in a position corresponding to that of the first motion vector determined to have low reliability and a shooting interval between the images; and
a motion vector substituting unit that is configured to substitute the first motion vector determined to have low reliability with the estimated motion vector when the second motion vector computed in the position corresponding to that of the first motion vector determined to have low reliability has high reliability.

2. The image processing apparatus according to claim 1, wherein:
shooting is performed in order of the first image, the second image, and the third image,
the first image is a short-exposure image,
the third image is an intermediate-exposure image having an exposure time longer than that of the short-exposure image, and
the second image is a long-exposure image having an exposure time longer than that of the intermediate-exposure image.

3. The image processing apparatus according to claim 2, further comprising:
a first positional deviation correcting unit that is configured to correct a positional deviation between the first and third images based on the second motion vectors;
a first synthesizing unit that is configured to synthesize a pair of images whose positional deviation is corrected by the first positional deviation correcting unit;
a second positional deviation correcting unit that is configured to correct a positional deviation between the image synthesized by the first synthesizing unit and the second image based on the first motion vectors, using the first motion vector subjected to a substitution in a case where the motion vector substituting unit performs the substitution, and the first motion vector computed by the first motion vector computing unit in a case where the motion vector substituting unit does not perform the substitution; and
a second synthesizing unit that is configured to synthesize a pair of images whose positional deviation is corrected by the second positional deviation correcting unit to create a synthesized image.

4. The image processing apparatus according to claim 1, wherein:
shooting is performed in order of the first image, the second image, and the third image,
the first image is an intermediate-exposure image,
the second image is a short-exposure image having an exposure time shorter than that of the intermediate-exposure image, and
the third image is a long-exposure image having an exposure time longer than that of the intermediate-exposure image.

5. The image processing apparatus according to claim 1, wherein:
shooting is performed in order of the first image, the second image, and the third image, the first image is an intermediate-exposure image, the second image is a long-exposure image having an exposure time longer than that of the intermediate-exposure image, and the third image is a short-exposure image having an exposure time shorter than that of the intermediate-exposure image.

6. The image processing apparatus according to claim 1, wherein:

shooting is performed in order of the first image, the third image, and the second image, the first image is a short-exposure image, the third image is an intermediate-exposure image having an exposure time longer than that of the short-exposure image, and the second image is a long-exposure image having an exposure time longer than that of the intermediate-exposure image.

7. The image processing apparatus according to claim 1, wherein:

shooting is performed in order of the first image, the third image, and the second image, the first image is an intermediate-exposure image, the second image is a short-exposure image having an exposure time shorter than that of the intermediate-exposure image, and the third image is a long-exposure image having an exposure time longer than that of the intermediate-exposure image.

8. The image processing apparatus according to claim 1, wherein:

shooting is performed in order of the first image, the third image, and the second image, the first image is an intermediate-exposure image, the second image is a long-exposure image having an exposure time longer than that of the intermediate-exposure image, and the third image is a short-exposure image having an exposure time shorter than that of the intermediate-exposure image.

9. An image processing method for obtaining a motion vector between at least three images, including first, second, and third images obtained through continuous shooting under different exposure conditions in which an exposure amount difference between the first and second images is larger than that between the first and third images, the image processing method comprising:

computing first motion vectors as motion vectors between the first and second images in a plurality of positions on the first image;

computing second motion vectors as motion vectors between the first and third images in the plurality of positions on the first image where the first motion vectors are computed;

determining a reliability level of the first motion vectors;

determining a reliability level of the second motion vectors;

computing an estimated motion vector between the first and second images for a motion vector determined to have low reliability out of the first motion vectors computed in the plurality of positions on the first image based on a second motion vector computed in a position corresponding to that of the first motion vector determined to have low reliability and a shooting interval between the images; and substituting the first motion vector determined to have low reliability with the estimated motion vector when the second motion vector computed in the position corresponding to that of the first motion vector determined to have low reliability has high reliability.

10. A non-transitory computer-readable medium storing an image processing program for obtaining a motion vector between at least three images, including first, second, and third images obtained through continuous shooting under different exposure conditions in which an exposure amount difference between the first and second images is larger than that between the first and third images, the image processing program causing a computer to execute functions comprising:

computing first motion vectors as motion vectors between the first and second images in a plurality of positions on the first image;

computing second motion vectors as motion vectors between the first and third images in the plurality of positions on the first image where the first motion vectors are computed;

determining a reliability level of the first motion vectors;

determining a reliability level of the second motion vectors;

computing an estimated motion vector between the first and second images for a motion vector determined to have low reliability out of the first motion vectors computed in the plurality of positions on the first image based on second motion vector computed in a position corresponding to that of the first motion vector determined to have low reliability and a shooting interval between the images; and substituting the first motion vector determined to have low reliability with the estimated motion vector when the second motion vector computed in position corresponding to that of the first motion vector determined to have low reliability has high reliability.

* * * * *